United States Patent [19]

Gullong

[11] 4,453,789
[45] Jun. 12, 1984

[54] SHELTER FOR ELECTRONIC GAMES

[76] Inventor: C. Barton Gullong, 163 Lynn Ave., Hampton Bays, N.Y. 11946

[21] Appl. No.: 368,562

[22] Filed: Apr. 15, 1982

[51] Int. Cl.³ .................................................. A47B 88/00
[52] U.S. Cl. ................................ 312/324; 312/257 SM; 312/7.2; 312/100
[58] Field of Search ............... 312/195, 208, 223, 292, 312/7.2, 257 A, 257 SK, 257 SM, 324, 263; 361/356, 369, 380, 390; 324/110

[56] References Cited

U.S. PATENT DOCUMENTS

| 2,977,171 | 3/1961 | Gleason | 312/111 X |
| 3,056,639 | 10/1962 | Caminker et al. | 312/257 SK |
| 3,623,784 | 11/1971 | Neufeld | 312/263 |
| 3,830,499 | 8/1974 | Alldredge | 312/100 X |
| 3,944,718 | 3/1976 | Bright | 361/356 X |
| 4,235,494 | 11/1980 | Chu et al. | 312/333 X |
| 4,296,983 | 10/1981 | Rogers et al. | 312/263 |
| 4,319,793 | 3/1982 | Suttles | 312/257 R |

FOREIGN PATENT DOCUMENTS

| 2386965 | 12/1978 | France | 312/263 |
| 888010 | 1/1962 | United Kingdom | 312/100 |
| 1162774 | 8/1969 | United Kingdom | 312/263 |

Primary Examiner—William E. Lyddane
Assistant Examiner—Joseph Falk
Attorney, Agent, or Firm—Bauer & Amer

[57] ABSTRACT

A structure positioned in enclosed relation about electronic games or the like, which for ease of shipping is in a disassembled condition, and at the site of use is readily assembled using ordinary nuts and bolts, but wherein the nuts and bolts have a strategic internal position to which there is no access for tampering; the electronic games being thus protected against vandalism and making feasible their location in retail establishments permitting only an optimum minimum degree of supervision.

1 Claim, 6 Drawing Figures

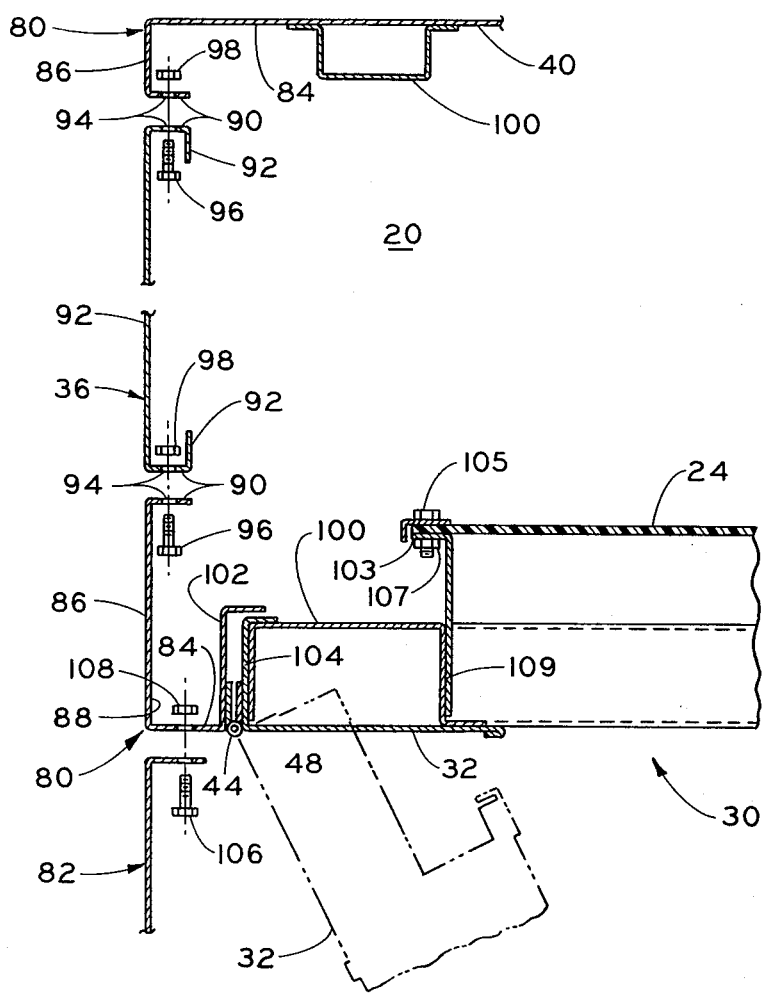
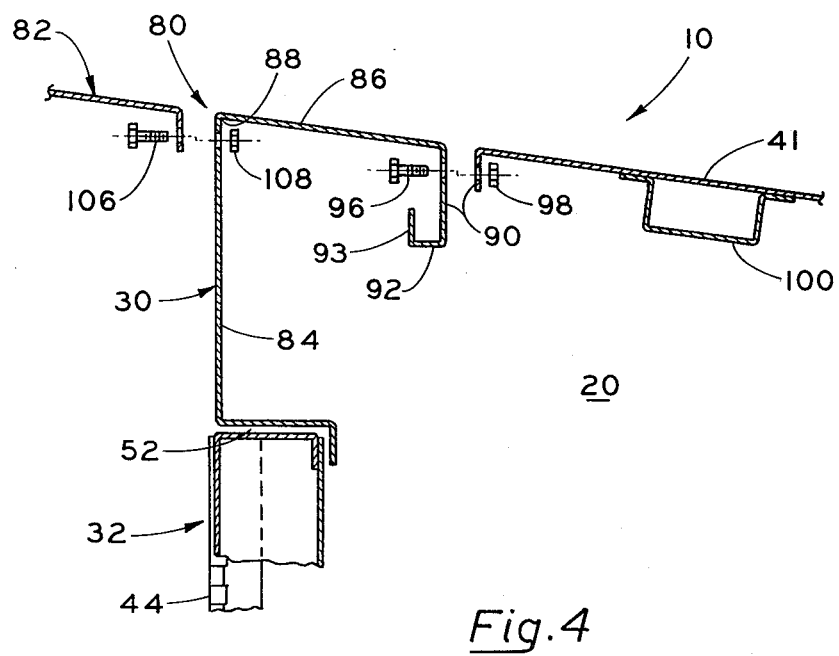
Fig. 3
Fig. 4

SHELTER FOR ELECTRONIC GAMES

BACKGROUND OF THE INVENTION

The present invention relates generally to a security enclosure or structure for an amusement device such as an electronic game, and more particularly to improvements which contribute to providing such a structure, that while easily assembled, is not conversely easily disassembled, all as is more particularly described and explained herein.

As is already well known, being exemplified by U.S. Pat. No. 3,830,499, vandalism of a so-called pin ball or other amusement game of the kind typically used by teenagers can be, and for good business reasons should be, minimized by having the game enclosed within a structure permitting only such access thereto as is necessary to "play" the game. The alternative is to restrict the game to a location where its use can be effectively supervised. Thus known game-enclosing shelters embody assembly or construction techniques which provide maximum security, such as the welding or riveting of component parts, the avoidance of doors or panels which selectively provide access openings into the interior thereof, and other such practices. These known shelters, however, being welded into three-dimensional or standing structures at their site of manufacture, are often too excessive in bulk and size for shipping and transportation. Also, once fixed in position, the enclosed game cannot readily be changed, and thus if the play value thereof has been diminished by the frequency of play, there is no practical solution except to dismantle the enclosing structure.

Broadly, it is an object of the present invention to provide a shelter for an electronic game, specifically of the type which frequently should be changed to maintain an optimum high level of play value, overcoming the foregoing and other shortcomings of the prior art. Specifically, it is an object to provide a protective shelter with a key-operated door mounted in a large-sized access opening into the interior thereof for changing of the game, which, by virtue of said opening is nevertheless not vulnerable to vandalizing of the game therein. Moreover, the inventive shelter is adapted to be shipped in a disassembled condition, for ready assembly at the site of use, and after which, is not conversely readily disassembled, all as will be subsequently explained in detail.

A game-enclosing structure of the type intended to provide an internal operative area for maintaining a game in an optimum condition protected against vandalism, and demonstrating objects and advantages of the present invention, includes a front panel, rear panel, roof, and opposite side panels interconnected into a unitary structure bounding said internal operative area. The front panel is made with a front rectangular-shaped door opening sized to mount two doors in adjacent position therein, in further connection with which there is provided a pair of hinges, each sized to extend the long dimension of the door opening and each operatively oriented vertically in attached relation to each of the opposite sides of said door opening so as to hingedly mount a cooperating pair of doors therein that cannot be readily unhinged because of the length of the hinge pins.

To prevent access to the interior or internal area by by-passing the lock on the doors, the shelter is constructed with novel corner configurations which provide internal positions to the connecting bolt means for the components (e.g. front, side, rear and roof panels). Referring to the front panel, by way of illustration, two such corner configurations are provided at each of the two corners of said front panel, each consisting of a first section extending from the hinge in the plane of the front panel to a second section extending in a perpendicular relation therefrom, so as to subtend a 90 degree angle at each said corner. An assembly flange is provided on each said second section projecting inwardly into said internal operative area of said structure. In like fashion, two identical corner configurations are provided at each of the two corners of said rear panel, and also along the tops of the front and rear panels. As a consequence of the configurations, and more particularly of the assembly flanges thereof, whereby in the assembly of the structure the aforementioned assembly flanges of said front, rear and side panels are adapted to be placed in adjacent relation to each other and thereby have an internal operative location within said structure, and bolt means and the like are operative to interconnect said assembly flanges to each other to thereby correspondingly interconnect said front, rear and side panels into said unitary structure while minimizing such access bolt means as might result in the unauthorized disassembly of the structure.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 3 is a partial plan view, in section taken along line 3—3 of FIG. 2, illustrating structural details, particularly of the hinge of the structure, and wherein a door mounted for pivotal movement by said hinge is shown in positions of movement depicted in full line and phantom line perspective;

FIG. 4 is a partial exploded view, taken in section along line 4—4 of FIG. 2 illustrating details in the manner in which the roof is embodied in the structure;

Figure 5:
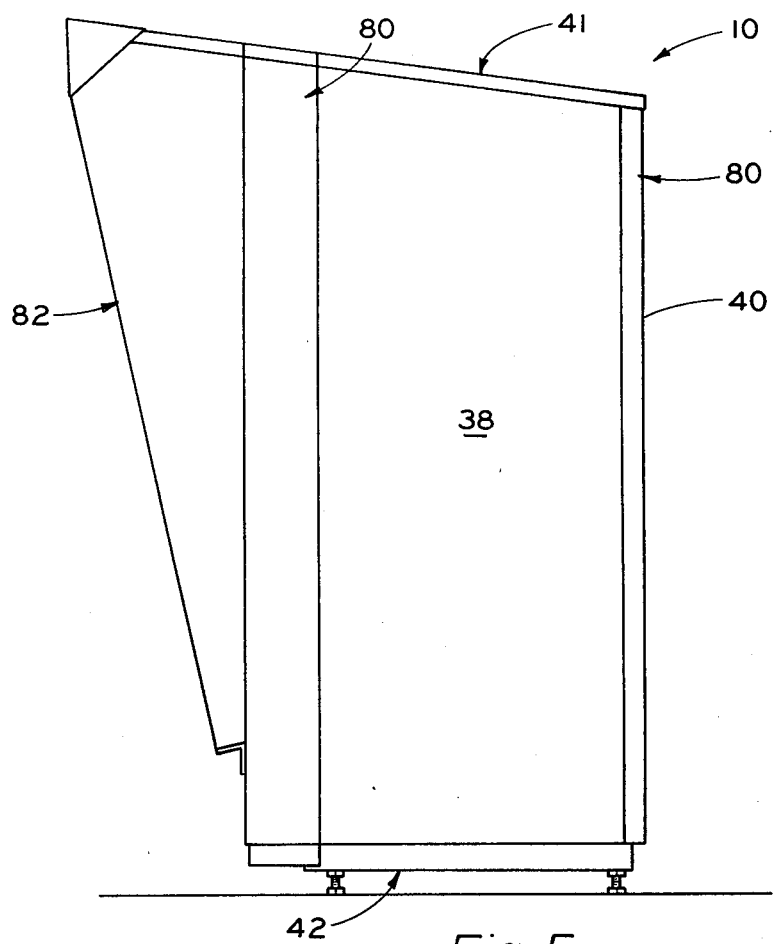
FIG. 5 is a side elevational view projected from FIG. 2 illustrating further details of the structure.
Figure 6:
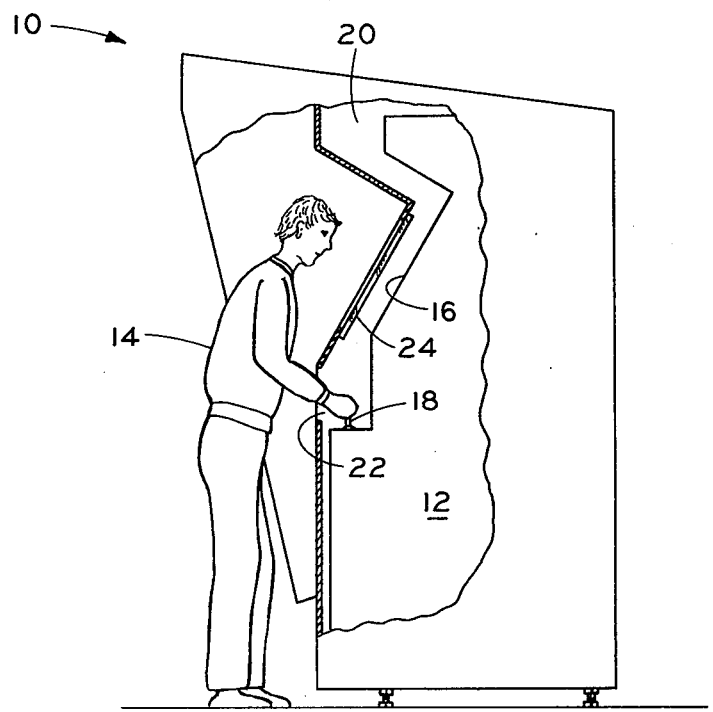
FIG. 6 is a simplified side elevational view, with portions broken away, illustrating a typical end use of the shelter in which it houses an electronic game while permitting a user access thereto incident to the playing of the game.

FIGS. 1-6 illustrate the details of a structure, generally designated 10, which serves as a shelter or a protective enclosure positioned about two electronic games so as to minimize vandalism of such games, and these figures will, of course, be extensively referred to in the description which follows. Prior to such description, however, it is helpful to refer to FIG. 6 which illustrates a typical end use of the shelter or structure 10. More particularly, it will be understood that illustrated in FIG. 6 is a typical electronic or video game 12 of the type having a computer program to create on a television screen cartoons in which some of the action is controlled by a player 14. While the details of the game 12 do not form any significant part of the within invention, it is nevertheless helpful to understand that the game 12 is of the type having a video screen 16 on which there may be typically displayed a space ship moving horizontally through a select number of different scenes in which obstacles are encountered. That is, with each scene the player 14 faces increasing difficulty in traversing the course and scoring points. During play of the game 12, the player 14 manipulates hand controls 18 which typically will control the altitude, the speed of said space ship, release bombs, fire lasers, etc., the aforesaid being the result of the operation of electronic circuit boards having memory storage devices and other well known electronic components which produce the results noted as a result of the interaction of the programs stored in the memory storage devices with the electric current that passes through the circuitry as a result of manipulation by the player 14 of the hand controls 18.

Still referring to FIG. 6, it will be noted that the electronic game 12 is essentially protected from vandalism by being stored within an internal operative area 20 bounded by the structure 10 and wherein the player 14 has only limited access through an opening 22 to the hand controls 18, and also has visibility of the video screen 16 through a transparent pane 24 of unbreakable glass or plastic. The crux of the within invention resides in the construction of the shelter 10 such that while it is easily assembled, it is not conversely easily disassembled, and therefore can be effectively used to protect two side-by-side electronic or video games 12 against vandalism. As a result, rhe video games 12, which typically are coin operated, can be rented or leased to a retail establishment, such as a restaurant or a store, and located for us therein or even immediately outside the front door of such establishments, without the need for supervision to prevent vandalizing or destruction of the games 12.

Figure 1:
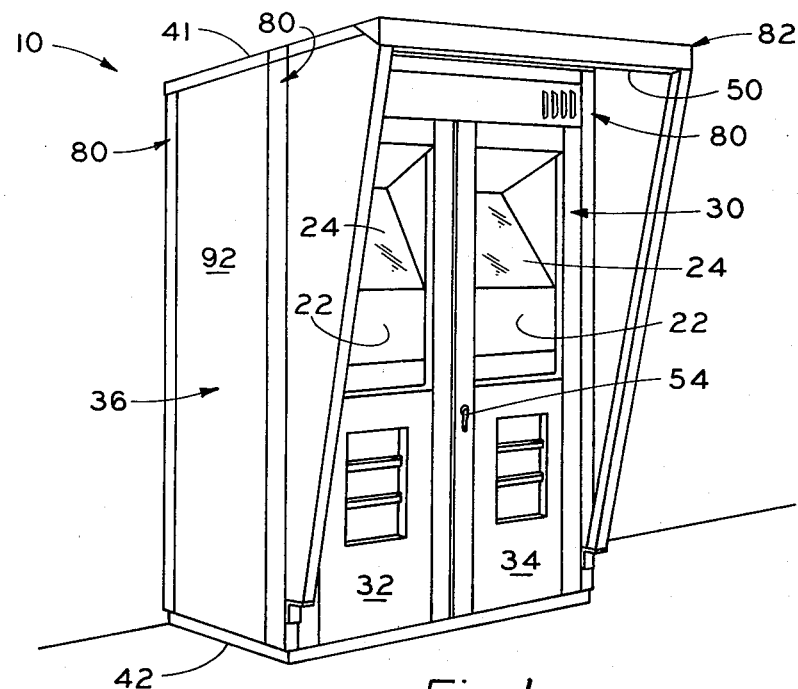
FIG. 1 is a perspective view of a protective shelter for two electronic games demonstrating objects and advantages of the present invention.
Figure 2:
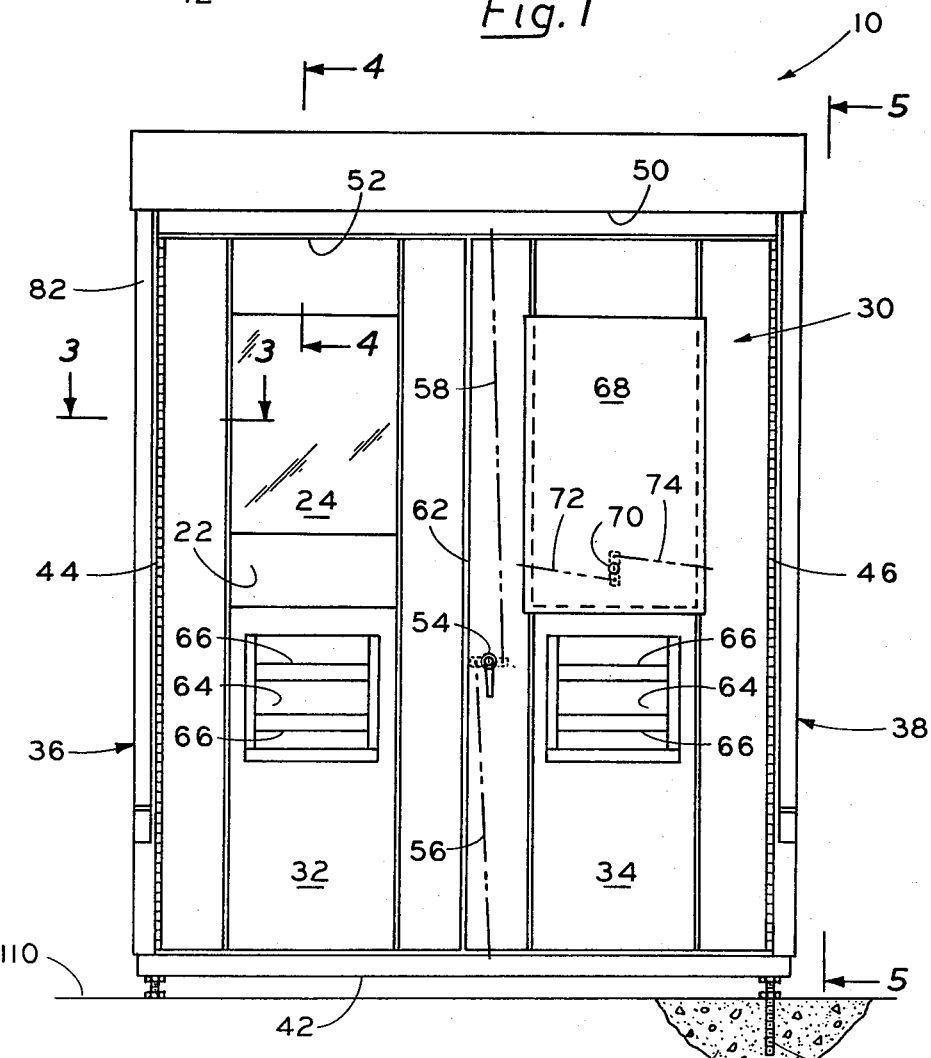
FIG. 2 is a front elevational view of said shelter or structure.

Focusing now more particularly on the construction of the shelter 10, and in doing so reference should more particularly be made to FIGS. 1, 2 and 5, it will be noted that shelter 10 includes an interconnected operative arrangement of panels or construction members which bound the previously noted internal operative area 20. More particularly, one such construction member or panel consists of a front panel 30 which is easily recognized by having two identically constructed doors 32 and 34 in which each include the previously noted transparent unbreakable glass or plastic pane 24 and the access opening 22. Connected on opposite sides of the front panel 30, at each corner thereof, are opposite side panels 36 and 38, the remote or rear edge of each of which is connected to a rear panel 40. Completing the structure 10 is a roof 41 and a bottom or floor panel 42.

FRONT PANEL AND DOORS

At this point in the description it is convenient to note, with particular reference to FIG. 2, that the doors 32 and 34 are identically constructed and that the pivotal movement of each about so-called piano hinges 44 and 46 provide the means for placing within and removing the electronic games 12 from the protected operative area 20. That is, as part of the security against vandalism which is embodied in the structure 10, the hinges 44, 46 are specifically selected to extend for substantially the entire vertical height of the structure 10 and, as such, include, as best illustrated in FIG. 3, a hinge pin 38 which is of a corresponding size that also almost is the entire vertical height of the structure 10. The reason for this is that a hinge pin 46 of the size described cannot be readily removed from the interconnecting knuckles of the hinge, this particularly being the case wherein an overhang of the roof 41 is intentionally extended over the front panel 30 and is thus in what would be the path of removal of the hinge pins 38, 48.

Now referring mainly to FIG. 2, and to complete the description of the highlights of the doors 32, 34 which are mounted in the front door opening of panel 30, designated 52 in FIG. 2, said door opening will be understood to be of a rectangular shape in which the long dimension is the size of the hinge pin of the hinges 44, 46, and the width is essentially the distance between said hinges. In the closed position of the doors 32, 34, as illustrated in FIG. 2, a key-operated lock 54 of any suitable and appropriate construction and operational mode, is provided to, in turn, operate locking rods 56 and 58 to, in turn, maintain the door 34 in its locked condition. When the door 34 is in its locked position, it will be understood that this effectively also will hold the door 32 in its locked condition, the doors being of a common type having confronting edges 60 and 62 which interlock and require a sequence in which door 34 is opened first to release door 32, and in closing door 32 is required to be closed first and said door is thereafter held in place by the closing of door 34.

As shown in FIG. 2, each door 32, 34 also includes openings 64 subdivided by bars 66 which, it will be understood, provides three access openings intended to align with the coin-receiving mechanism (not shown) of a video game 12 situated behind each of the doors 32, 34.

At night, or at times when it is intended that there not be any playing of the games 12, each of the doors it will be understood have provision for the mounting over the transparent panel 24 of a rigid panel 68 having a key-operated lock 70 which moves locking rods 72 and 74 into their locking or unlocking conditions.

INTERCONNECTION OF THE STRUCTURAL MEMBERS

From what has been described it should be readily appreciated that front panel 30 and the doors 32 to 34 thereof embody features which enable the doors, when open, to provide a door opening 52 of a large enough size for movement of the games 12 into and out of the operative area 20 while at the same time, when the doors are closed, prevent unauthorized access into the operative area 20 as might result in vandalizing or destruction of the video games 12 being stored therein. The aforesaid, however, would be for naught if it were possible to obtain access into the operative area 20 through some other structural member other than the doors, and in this way bypass the security afforded by the key-operated lock 54. With this specifically in mind, it is therefore an essential feature of the present invention, as will now be described, that the structure 10 is assembled in such a manner that it cannot be disassembled from its exterior. In embodying this feature, it is also part of the utility of the structure 10 that it can be shipped in a disassembled condition to a point of use and readily assembled into a three dimensional structure upon its arrival. Stated another way, while of course it would be possible to construct a vandal-proof structure at a point of manufacture by welding or otherwise interconnecting the various structural members thereof, the three dimensional structure which would then result would obviously be too large and unwieldy to ship or transport. It is far more satisfactory, and in fact crucial from a commercial point of view, to construct the structure of the type involved herein using bolts and other such conventional fastening means, rather than welding or riveting or the like, but the use of such bolts or threadably interconnected members must not be permitted to make it readily possible to disassemble the structure 10 since this, in turn, will permit the vandalizing or unauthorized access to the valuable video games being stored within the structure.

In accordance with the present invention, the inteconnected structural members of the structure 10, namely, the front panel 30, the opposite side panel 36 and 38, and the rear panel 40 are readily interconnected or assembled at the site of use using nut and bolt means, and yet after such assembly the resulting standing structure 10 cannot be violated or readily disassembled so as to permit unauthorized access into the internal area 20 thereof. The manner in which the aforesaid is achieved can be readily appreciated from FIG. 3, to which figure reference should now be made.

More particularly and as best illustrated in FIG. 3, the security which is embodied in the structure 10, resides mainly in a corner configuration, generally designated 80, which it will be understood is of an identical nature and exists at each of the four corners of the structure 10, it being understood that the reference to the four corners disregards an auxiliary structure 82 which is added as a weather barrier in overhanging relation to the front panel 30. Each said corner configuration 80 being identically constructed, as just noted, can be readily understood from the description which will be given of that corner construction located in the left-hand side of front panel 30 and more particularly illustrated in cross section in FIG. 3. The said configuration 80 includes a first section 84 which is in the plane of the front panel 30 and, as illustrated in FIG. 2, extends for the entire height of the structure 10, even extending slightly above hinge 44. Cooperating with section 84 is a continuation thereof in the form of a second section 86 which is of a perpendicular relation thereto and, as a result, subtends a 90° angle 88 between the sections 84, 86. At the remote end of section 86, this structural member has an inwardly turned assembly flange 90. Thus, at each corner the configuration 80 which defines same has the sections 84, 86 and, more important, has an assembly flange 90 on the latter which extends for the entire vertical height of the front panel 30.

The left opposite side panel 36 which is adapted to be attached to the front panel assembly flange 90 just described, includes a medial portion or body 92 which is of the same vertical height as the corner configuration 80 and has, at opposite sides, a cooperating assembly flange, which also is designated 90 in FIG. 3. The side panel assembly flanges 90 may optionally be provided with an additional turned-in lip 92 which enhances the structural rigidity of the opposite sides of the panel 36. Lip 92 also minimizes unauthorized access through the door opening 22 to the connecting means applied to the assembly flanges 90.

In the assembly of the structure at the site of use, it should be readily understood from FIG. 3 and from the description thus far provided, that to attach the side 36 to the left side corner configuration 80 of the front panel 30 it is only necessary to place the assembly flanges 90 of the referred to panels in contact with each other and to insert through aligned openings 94 provided in each at spaced intervals a threaded bolt 96 having a threadably engageable nut 98. In a typical structure, which may be approximately 86 inches in height it has been found adequate to use six nut and bolt means 96, 98, but this, of course, can be varied.

In assemblying the rear panel 40 to the structure, the corner configuration is again utilized, said configuration being in this instance embodied in the construction of the rear panel 40. This is illustrated in FIG. 3 by the designation of the first and second sections of the configuration by the use of the same reference numerals to indicate like parts for the corner configuration already described. In the assembly, the assembly flanges 90 are again placed in contact with each other and the bolts 96 inserted through the aligned openings 94 such that threadable engagement can be made to these bolts by threadably engageable nuts 98.

Although it should be readily appreciated from FIGS. 3 and from the description of the assembly or interconnection of the front panel 30, side panel 36 and rear panel 40, the threadably engaged fastening means 96, 98 used for this purpose occupy a strategic internal position within the internal operative area 20. In other words, anyone external to or on the outside of the structure 10 cannot readily obtain access to the interconnected nuts and bolts, 96, 98. Moreover, once the doors 32, 34 are locked with the locking mechanism 54, which would be the usual procedure, there can be no unauthorized tampering with the bolt means 96, 98.

It will of course be understood that the right side of the front panel 30, as well as that of the right side of the rear panel 40, and the right side panel 38 which is connected in spanning relation therebetween, is also assembled using the corner configurations 80 and the internally located bolt means 96, 98 in their operative positions physically interconnecting cooperating assembly flanges 90 provided on these structural components.

To complete the security of the structure 10, it is of course necessary to prevent unauthorized entry into the operative area 20 through the top of the structure. This is achieved using the internally located bolt means 96, 98 already described. For completeness' sake, however, reference should be made to FIG. 4 in which it will be noted that a corner configuration 80 is also provided along the upper edge of the front panel 30, the same being more particularly located along the portion of the front panel which bounds the upper edge of the door opening 52. The horizontally oriented corner configuration of the front panel 30 includes the same front section 84 and second section 86 which subtends therebetween the 90° angle 88. There also is provided at the remote end of the section 88 an inturned assembly flange 90. In this instance, it is advantageous to provide additional inturned lips 92, 93, which serve the useful purpose of preventing access to the bolt means for unauthorized tampering through the front door opening 22. Cooperating with the assembly flange 90 is another inturned assembly flange, similarly designated 90, which is provided on the roof panel 41. In a manner which should be readily understood from the description already provided, positioning of the assembly flanges 90 in adjacent position aligns the openings 94 and thereby readily permits the interconnection of the roof 41 to the front panel 30 using internally located bolt means 96, 98.

Although not shown, it should be understood that roof panel 41 is constructed at its opposite end in a fashion similar to that already described, and that the rear panel 42 also has a horizontally oriented corner configuration 80 along its upper edge and that this structure is utilized in completing the connection of the roof 41 in spanning relation between at least the front and rear panels 30, 40 as a cover, or closure for the operative area 20.

For completeness' sake, it is mentioned that the various structural components referred to in the preceding description embody conventional aspects which were not described since they do not form an essential part of the within invention. For example, as illustrated in FIGS. 3 and 4, brace constructions 100 are welded at strategic locations to the members to increase the structural rigidity thereof. Also, cooperating spaced apart sections, such as those designated 102 and 104 on the front door 32 and front panel 30, serve as locations for welding the hinge plates for the hinge 44. By way of contrast to the internally located bolt means 96, 98, it will be noted, as in FIGS. 3, 4, that the auxiliary structure 82 is connected to extend forwardly of the front panel 30 by bolts and nuts 106, 108 which are not protected against tampering. While this is not desirable, it is not of any significance to the security function of the shelter 10 and is provided in order to contribute to achieving the objective of being able to ship the shelter 10 in an optimum compact condition.

It also is to be noted, but is not necessary to describe, that the floor panel 42 is embodied in the structure 10 in any appropriate manner. In a preferred installation, the entire structure 10, as illustrated in FIG. 2, should be secured in a concrete slab 106 or the like on threaded bolts 108, to thereby securely mount the floor panel 42 in place. For all intents and purposes, however, the location of the floor panel 42 adjacent the support surface 110 provides adequate security against unauthorized access into the operative area 20.

Mounted to extend inwardly into the operative area 20 from the side of brace 100 opposite the hinge 44, is a mounting panel 101 having a laterally oriented flange 103. At the remote end of this mounting panel, are nut and bolt means 105, 107 which are used to secure the non-breakable transparent panel 24 in its operative position in each of the doors 32, 34. The internal position of the bolt means 105, 107, and the welding of the mounting panel 101, as at 109, maintains the security of the structure, while the welding attachment 109 does not increase to an undesirable extent the bulk and size for shipping and transportation of the front panel 30.

From the within description, it should be readily appreciated that there has been described herein a standing structure 10 at its point of use, which can be shipped in a disassembled condition and which, after, assembly, cannot readily be disassembled by unauthorized personnel. Although a preferred embodiment has been described, it will be understood that a latitude of modification, change and substitution is intended in the foregoing disclosure, and that in some instances some features of the invention will be employed without a corresponding use of other features. Accordingly, it is appropriate that the appended claims be construed broadly and in a manner consistent with the spirit and scope of the invention herein.

What is claimed is:

1. A game-enclosing structure having an internal operative area for maintaining a game in an optimum condition protected against vandalism comprised of a front panel, rear panel, roof, and opposite side panels interconnected into a unitary structure bounding said internal operative area, said front panel having a front rectangular-shaped door opening sized to mount at least one door therein, a hinge sized to extend the long dimension of said door opening and operatively oriented vertically in attached relation to a side of said door opening so as to hingedly mount a cooperating door therein, two corner configurations at two ends of said front panel, each of said corner configurations consisting of a first section extending from said hinge in the plane of said front panel and a second section extending in a perpendicular relation therefrom so as to subtend a 90° angle at each said corner, an assembly flange on each said second section of said front panel projecting inwardly into said internal operative area of said structure, two corner configurations at two ends of said rear panel consisting of a first section extending in the plane of said rear panel and a second section extending in a perpendicular relation therefrom to subtend an angle of approximately 90° at each said corner, an assembly flange on each said second section of said rear panel projecting inwardly into said internal operative area of said structure, a roof attached at least to said front and rear panels serving as both a cover and closure for said internal operative area, said roof having an assembly flange on said front and rear ends thereof projecting inwardly into said internal operative area of said structure, and two rectangular-shaped side panels each having along the long-dimensioned edges thereof an assembly flange projecting inwardly into said internal operative area, whereby in the assembly of said structure the aforementioned assembly flanges of said front, rear, side and roof panels are adapted to be placed in adjacent relation to each other and thereby have an internal operative location within said structure, and bolt means and the like are operative to interconnect said assembly flanges to each other to thereby correspondingly interconnect said front, rear, side and roof panels into said unitary structure while minimizing such access to said bolt means as might result in the unauthorized disassembly of said structure, and a forwardly extending overhang in said roof to both serve as a weather barrier and to project into the removal path of the hinge pin of said hinge and thereby contribute to obviating the removal of said hinge pin.

* * * * *